United States Patent
Yanjarappa et al.

(10) Patent No.: US 9,943,782 B2
(45) Date of Patent: Apr. 17, 2018

(54) CATIONIC VINYL IMIDAZOLIUM-BASED COPOLYMER FOR SEPARATING AN OIL-IN-WATER EMULSION

(71) Applicant: Dow Global Technologies LLC, Midland, MI (US)

(72) Inventors: M. J. Yanjarappa, Pune (IN); Cecile Boyer, Lake Jackson, TX (US); Stephen M. Hoyles, Lake Jackson, TX (US); Michael K. Poindexter, Sugar Land, TX (US)

(73) Assignee: Dow Global Technologies LLC, Midland, MI (US)

(*) Notice: Subject to any disclaimer, the term of this patent is extended or adjusted under 35 U.S.C. 154(b) by 77 days.

(21) Appl. No.: 14/414,590

(22) PCT Filed: Jul. 30, 2013

(86) PCT No.: PCT/US2013/052693
§ 371 (c)(1),
(2) Date: Jan. 13, 2015

(87) PCT Pub. No.: WO2014/022372
PCT Pub. Date: Feb. 6, 2014

(65) Prior Publication Data
US 2015/0166377 A1     Jun. 18, 2015

Related U.S. Application Data

(60) Provisional application No. 61/677,066, filed on Jul. 30, 2012.

(51) Int. Cl.
*B01D 21/01* (2006.01)
*C02F 1/52* (2006.01)
(Continued)

(52) U.S. Cl.
CPC ............ *B01D 17/047* (2013.01); *C02F 1/56* (2013.01); *C09K 8/035* (2013.01); *C09K 8/36* (2013.01); *C02F 2101/325* (2013.01)

(58) Field of Classification Search
None
See application file for complete search history.

(56) References Cited

U.S. PATENT DOCUMENTS 3,488,294 A    1/1970   Annand
4,026,794 A    5/1977   Mauceri
(Continued)

FOREIGN PATENT DOCUMENTS

EP    0544158          6/1993
EP    0544158 A1  *   6/1993   ............ A61K 8/817
(Continued)

OTHER PUBLICATIONS

Machine translation of Raubenheimer et al. (EP #0544158), pp. 1-6.*

(Continued)

*Primary Examiner* — Clare M Perrin
(74) *Attorney, Agent, or Firm* — Brooks, Cameron & Huebsch, PLLC

(57) ABSTRACT

Embodiments of the present disclosure include a method of separating an oil-in-water emulsion formed during crude oil production into a water phase and an oil phase that includes adding 1 part-per-million (ppm) to 10000 ppm of a cationic vinyl imidazolium-based copolymer to the oil-in-water emulsion, based on the total volume of the oil-in-water emulsion, to form a water phase and an oil phase, and separating the water phase from the oil phase.

7 Claims, 2 Drawing Sheets

(51) Int. Cl.
   *B01D 17/04*  (2006.01)
   *C09K 8/035*  (2006.01)
   *C09K 8/36*   (2006.01)
   *C02F 1/56*   (2006.01)
   *B03D 3/00*   (2006.01)
   *C02F 1/68*   (2006.01)
   *B01D 21/00*  (2006.01)
   *C02F 1/00*   (2006.01)
   *C02F 101/32* (2006.01)

(56) References Cited

U.S. PATENT DOCUMENTS

| | | |
|---|---|---|
| 4,120,815 A | 10/1978 | Raman |
| 4,160,742 A | 7/1979 | Raman |
| 4,224,150 A | 9/1980 | Buriks et al. |
| 4,383,926 A | 5/1983 | Buriks et al. |
| 4,702,844 A | 10/1987 | Flesher et al. |
| 4,741,835 A | 5/1988 | Jacques et al. |
| 4,802,992 A | 2/1989 | Fong et al. |
| 4,931,191 A | 6/1990 | Braden et al. |
| 5,128,046 A | 7/1992 | Marble et al. |
| 5,362,827 A | 11/1994 | Bock et al. |
| 5,552,498 A | 9/1996 | Braden |
| 5,560,832 A | 10/1996 | Sivakumar et al. |
| 5,635,112 A | 6/1997 | Ramesh et al. |
| 5,730,905 A | 3/1998 | Hart et al. |
| 5,921,912 A * | 7/1999 | Hart .............. B01D 17/047 210/708 |
| 6,025,426 A | 2/2000 | Hurlock et al. |
| 6,036,868 A | 3/2000 | Sivakumar et al. |
| 2006/0237372 A1 * | 10/2006 | Arciszewski ...... B01D 17/0217 210/708 |
| 2011/0031163 A1 | 2/2011 | Byrne et al. |

FOREIGN PATENT DOCUMENTS

| | | |
|---|---|---|
| ES | 2091996 | 6/1993 |
| WO | 2009067362 | 5/2009 |

OTHER PUBLICATIONS

Kokal et al. (Petroleum Engineering Handbook, "Chapter 12—Crude Oil Emulsions", published 2007, Introduction accessed online and provided as pp. 1-5).*
BASF, The Chemical Company, "Luviquat Polymer Grades" May 2012, Supersedes issue dated Apr. 2011 (32 pages).
K. Arnold, et al., "Surface Production Operations Design of Oil Handling Systems and Facilities" Third Edition (3 pgs).
International Search Report and Written Opinion for related PCT Application PCT/US2013/052693, dated Sep. 26, 2013 (10 pgs).
International Preliminary Report on Patentability for related PCT Application PCT/US2013/052693, dated Feb. 12, 2015 (4 pgs).

* cited by examiner

US 9,943,782 B2

CATIONIC VINYL IMIDAZOLIUM-BASED COPOLYMER FOR SEPARATING AN OIL-IN-WATER EMULSION

This application is a National Stage Application under 35 U.S.C. § 371 of International Application Number PCT/US2013/052693, filed Jul. 30, 2013 and published as WO 2014/022372 on Feb. 6, 2014, which claims the benefit to U.S. Provisional Application 61/677,066, filed Jul. 30, 2012, the entire contents of which are incorporated herein by reference in its entirety.

FIELD OF THE DISCLOSURE

The present disclosure relates to a method of separating an oil-in-water emulsion and more particularly to a method of separating an oil-in-water emulsion formed during crude oil production.

BACKGROUND

Chemical aids used to remove dispersed oil and/or solids from water are commonly referred to as water clarifiers, reverse emulsion breakers, deoilers, coagulants, flocculants and/or coalescence aids. In the oil and gas industry, after the initial separation of the bulk produced fluids (e.g., crude oil), the produced water still contains finely dispersed solids and oil. These oil and solids particles are well stabilized and are difficult to separate by means of physical settling alone. Often, such produced water cannot be reused nor disposed of as is and it is therefore necessary to find appropriate solutions to do so. Regulations around the world generally limit the oil and grease content in produced water to a maximum of 15 parts-per-million (ppm) to 50 ppm for discharge into the environment (Arnold, K.; Stewart, M. Surface Production Operations; 3rd ed.; Elsevier/Gulf Boston, 2008, 483). The water is thus treated to meet regulatory, environmental, and operational goals.

A range of synthetic water soluble cationic polymers are known to separate oil/solid particles from produced water. Poly(diallyl dimethylammonium chloride), copolymers of acrylamide or alkyl acrylates with various cationic co-monomers are known as water clarifiers. Chemical treatment of the produced water involves the addition of a few ppm levels of inorganic salts and/or organic polymers to facilitate the separation through coagulation and floc formation. Organic polymers (ionic or neutral) can be more effective than the inorganic salts and results in water with minimum oil/solid residues.

SUMMARY

The present disclosure provides a method of separating an oil-in-water emulsion formed during crude oil production into a water phase and an oil phase using a cationic copolymer. As discussed herein, the oil-in-water emulsion includes droplets of oil, such as crude oil. Specifically, embodiments of the present disclosure include a method of separating the oil-in-water emulsion formed during crude oil production into a water phase and an oil phase that includes adding 1 part-per-million (ppm) to 10000 ppm of a cationic vinyl imidazolium-based copolymer to the oil-in-water emulsion, based on the total volume of the oil-in-water emulsion, to form a water phase and an oil phase, and separating the water phase from the oil phase.

DETAILED DESCRIPTION

Figure 1A:
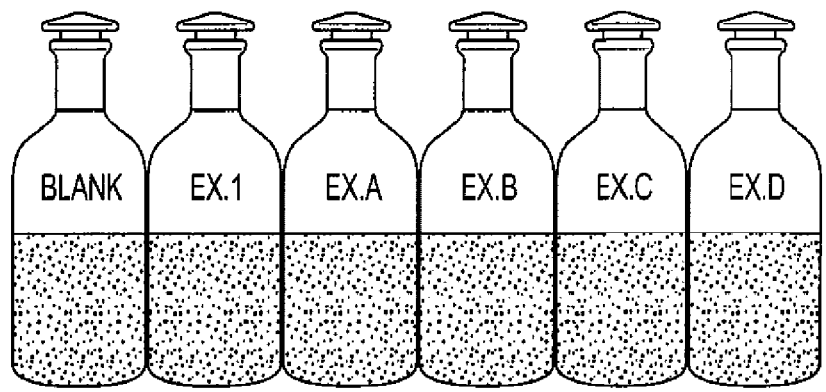
FIG. 1A is a photographic image of the synthetic produced oil-in-water emulsion for Bottle Test Procedure 1, treated with 0 ppm of cationic polymer Example 1 and Comparative Examples A-D (pH about 7.6).

The present disclosure provides a method of separating an oil-in-water emulsion, commonly referred to in the oilfield industry as a reverse emulsion, using a cationic copolymer, where the cationic copolymer helps to break the emulsion into a water phase and an oil phase. The method of the present disclosure is particularly useful in crude oil production and processing systems including refinery water treatment and even petrochemical plants.

As discussed herein, an oil-in-water emulsion can include droplets of oil, such as crude oil. The oil-in-water emulsion can also include, besides oil droplets, solid particles, such as clays, silts, sand, corrosion by-products, and scale, among other solid particles which can be present in the emulsion. As discussed herein, separating the oil-in-water emulsion is a process in which the emulsion is broken into its constituents of a water phase and an oil phase. As used herein, the "water" of the oil-in-water emulsion and/or the water phase can include, for example, a brine, a connate water, surface water, steam condensate, carbonated water, sea water and a combination thereof. For brevity, the word "water" is used herein, where it is understood that "brine," "connate water," "surface water," "steam condensate," "carbonated water," and/or "sea water" can be used interchangeably when needed.

The oil-in-water emulsion can be produced in extracting crude oil (a naturally occurring flammable liquid found in geological formations beneath the earth's surface, which consists of a complex mixture of hydrocarbons of various molecular weights). An oil-in-water emulsion can be formed in almost every phase of crude oil production and processing. As used herein, "oil-in-water" emulsions can include oil-in-water (e.g., a reverse emulsion) and multiple or complex emulsions, as are known, where the oil forms the dispersed phase and the water forms the continuous phase. Droplets or particles of the oil-in-water emulsion can, but need not, vary in size from 1 micrometer to 1000 micrometer. Droplets or particles of less than 1 micrometer and/or greater than 1000 micrometer are also possible. As used herein, resolution, separation or reverse demulsification means the breaking of an oil-in-water emulsion into an oil phase and a water phase.

The cationic copolymer of the present disclosure is a cationic vinyl imidazolium-based copolymer. For the various embodiments, the cationic vinyl imidazolium-based copolymer is formed with monomers of N-vinylcaprolactam, N-vinyl-2-pyrrolidone and quaternized N-vinylimidazole. The quaternized N-vinylimidazole can consist of 3-methyl-N-vinylimidazolium methyl sulfate. For the various embodiments, the cationic vinyl imidazolium-based copolymer can be supplemented with low levels of additives without impairing separation performance. The additive can consist of, but is not limited to, biocidal preservatives and can be included at levels up to 1 weight percent (wt. %) relative to the total weight of the cationic copolymer/additive mixture. In one embodiment, the cationic vinyl imidazolium-based copolymer is a copolymer of N-vinyl-caprolactam (50 wt. %), N-vinyl-2-pyrrolidone (40 wt. %) and 3-methyl-N-vinylimidazolium methyl sulfate (10 wt. %). One such cationic vinyl imidazolium-based copolymer is available from BASF under the trade name LUVIQUAT® HOLD.

The cationic copolymer of the present disclosure can be prepared by solution, emulsion, or dispersion polymerization techniques. The weight average molecular weight of the cationic vinyl imidazolium-based copolymer can range from 5000 grams/mole (g/mol) to 5000000 g/mol and preferably ranges from 10000 g/mol to 1000000 g/mol. In one embodiment, the cationic vinyl imidazolium-based copolymer of the present disclosure has a weight average molecular weight of about 700000 g/mol. Weight average molecular weight can be measured by gel permeation chromatography or small-angle dynamic light scattering.

Using the cationic copolymer of the present disclosure in separating an oil-in-water emulsion formed during crude oil production into a water phase and an oil phase may be carried out in a conventional manner. For example, separating the oil-in-water emulsion into the oil phase and the water phase and then recovering the oil phase and water phase may be carried out by treating the oil-in-water emulsion with a separating amount of the cationic copolymer of the present disclosure. Examples of separating the oil-in-water emulsion formed during crude oil production into a water phase and an oil phase can include adding 1 part-per-million (ppm) to 10000 ppm of the cationic vinyl imidazolium-based copolymer to the oil-in-water emulsion, based on the total volume of the oil-in-water emulsion, to form a water phase and an oil phase. As used herein, ppm is a concentration where one ppm is equivalent to one part per 1000000 parts (e.g. 1 microliter cationic vinyl imidazolium-based copolymer per liter of oil-in-water emulsion). Other examples of separating the oil-in-water emulsion formed during crude oil production into a water phase and an oil phase can include adding 10 ppm to below 10000 ppm, adding 10 ppm to 1000 ppm, or adding 10 ppm to 100 ppm of the cationic vinyl imidazolium-based copolymer to the oil-in-water emulsion, based on the total volume of the oil-in-water emulsion, to form a water phase and an oil phase.

Once formed, the water phase is separated from the oil phase. Once separated, either one of the water phase and/or the oil phase can be recovered for further processing. It may be possible that the oil phase so produced may be a dehydrated oil as is known in the art. For the various embodiments, it is also possible that the water phase might have a maximum of 15 ppm to 50 ppm of the particles (e.g., oil droplets). To determine the ppm of oil in the water phase use a standard oil ppm curve. To prepare the standard oil ppm curve, prepare a series of known concentrations of oil (the same oil present in the water phase) in a solvent (e.g., toluene; 1,1,1-trichloroethane; or Freon) and test the samples using a visible or IR spectrometer. Prepare the standard oil ppm curve from the results of the test. Use the same solvent to extract oil from the water phase discussed herein. After the extraction, test the solvent using the visible or IR spectrometer in the same manner and compare the results to the standard oil ppm curve. The ppm of the particles (e.g., oil droplets) in the water phase can then be interpolated from the standard oil ppm curve.

The method of the present disclosure includes adding the cationic vinyl imidazolium-based copolymer to the oil-in-water emulsion, based on the total volume of the oil-in-water emulsion, to form a water phase and an oil phase. In the oilfield, process conditions and the location of chemical injection points for water treatment chemicals vary from site to site as described in Arnold, K.; Stewart, M. Surface Production Operations; 3rd ed.; Elsevier/Gulf: Boston, 2008, Chapter 9, pp 482-609 as well as Manning, F. S.; Thompson, R. E. Oilfield Processing Volume 2: Crude Oil; Pennwell: Tulsa, 1995, Chapter 8, pp 145-158. The water phase of the oil-in-water emulsion can have a pH value in a range of 5 to 9. The cationic vinyl imidazolium-based copolymer of the present disclosure can help to destabilize the oil-in-water emulsion so as to enhance flocculation and eventual coalescence of the dispersed phase. A mixing process can be used with the oil-in-water emulsion in breaking the emulsion with the cationic vinyl imidazolium-based copolymer of the present disclosure. For example, sufficient agitation can be used to allow the cationic vinyl imidazolium-based copolymer of the present disclosure to mix thoroughly with the oil-in-water emulsion, followed by a period of flow inside a separator to promote gravity separation. The process also requires sufficient retention time in the separators to resolve the oil and water phases. The process may also require the addition of heat, gas flotation, and coalescers to facilitate separating the emulsion.

As appreciated, the efficacy of the cationic copolymer (e.g., the cationic vinyl imidazolium-based copolymer) of the present invention can be dependent upon a number of factors such as the properties of the crude oil and/or the water of the emulsion, the mixer type, and the design and operating conditions of the separator equipment. The most effective conditions for the separation may be at least partially determined through the use of a bottle testing procedure, as is known.

Other factors that can influence the separation can include, but are not limited to, temperature, pH, type of crude oil, brine composition, solids content, oil content, system residence time, and droplet size distribution. An increase in temperature can result in a decrease in emulsion stability. The pH of the oil-in-water emulsion may also affect the performance of the cationic copolymer of the present disclosure. Surprisingly, the vinyl imidazolium-based copolymer of the present disclosure is a high pH tolerant cationic water clarifier, which may offer differentiated solutions to those seeking to resolve oil-in-water emulsions having a high pH (e.g., those having a pH of 7.5 to 9.0).

Additionally, other additives such as conventional coagulants, conventional flocculants, alum, preservatives or a combination thereof may also be utilized with the vinyl imidazolium-based copolymer of the present disclosure.

The following examples are presented to describe preferred embodiments and utilities of the invention and are not meant to limit the invention unless otherwise stated in the claims appended hereto.

EXAMPLES

Example 1

A copolymer of N-vinylcaprolactatin (50 wt. %), N-vinyl-2-pyrrolidone (40 wt. %) and 3-methyl-N-vinylimidazolium methyl sulfate (10 wt. %) (LUVIQUAT® HOLD, BASF, 20 wt. % aqueous solution, weight average molecular weight approximately 700000 g/mol).

Comparative Example A

A copolymer of acrylamide (80 wt. %) and diallyldimethyl ammonium chloride (20 wt. %) (polyAAm-DADMAC, Aldrich #409081, 10 wt. % aqueous solution).

Comparative Example B

A copolymer of N-vinyl-2-pyrrolidone (70 wt. %) and 3-methyl-N-vinylimidazolium chloride (30 wt. %) (LUVIQUAT® FC370, BASF, 40 wt. % aqueous solution, weight average molecular weight approximately 100000 g/mol).

Comparative Example C

A copolymer of N-vinyl-2-pyrrolidone (50 wt. %) and 3-methyl-N-vinylimidazolium chloride (50 wt. %) (LUVIQUAT® FC 550, BASF, 40 wt. % aqueous solution, weight average molecular weight approximately 80000 g/mol).

Comparative Example D

A copolymer of N-vinyl-2-pyrrolidone (55 wt. %) and 3-methyl-N-vinylimidazolium chloride (45 wt. %) (LUVIQUAT® HM 552, BASF, 20 wt. % aqueous solution, weight average molecular weight approximately 400000 g/mol).

Aqueous Solution of the Cationic Polymer: 0.1 wt. % of active solution was prepared by dissolving appropriate amounts of above cationic polymer (Example 1 and Comparative Examples A-D) in 100 milliliter (mL) of deionized (DI) water.

Bottle Test Procedure

Bottle Test Procedure 1—Synthetic Produced Oil-in-Water Emulsion pH about 7.6

Prepare a synthetic produced oil-in-water emulsion by adding 250 µL of 2 wt. % aqueous NaOH solution to 650 mL of DI water and then mixing in 6.5 mL of mid-gravity Middle Eastern crude oil for about 10 seconds under high shear (12000 rpm) in a high speed rotor-stator mixer. Continue the agitation of the synthetic produced oil-in-water emulsion for a further 4 minutes under high shear of 12000 rpm. The resultant synthetic produced oil-in-water emulsion has a pH of about 7.6.

Distribute the synthetic produced oil-in-water emulsion into 6 reagent bottles (100 mL each). An image of the untreated bottles is captured immediately (FIG. 1A).

Figure 1B:
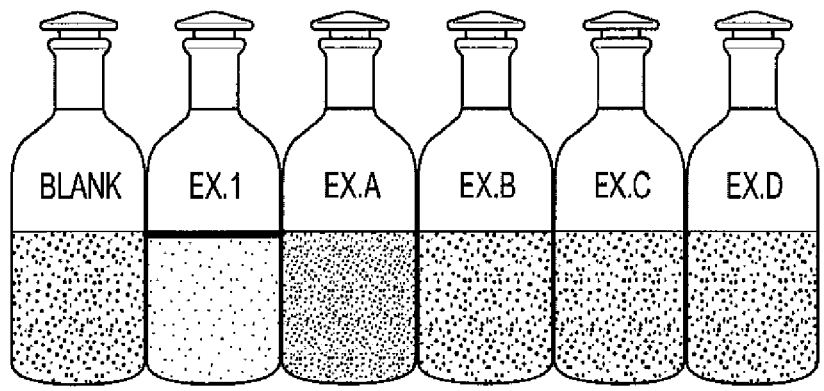
FIG. 1B is a photographic image of the synthetic produced oil-in-water emulsion for Bottle Test Procedure 1, treated with 50 ppm of cationic polymer Example 1 and Comparative Examples A-D (pH about 7.6).
Figure 1C:
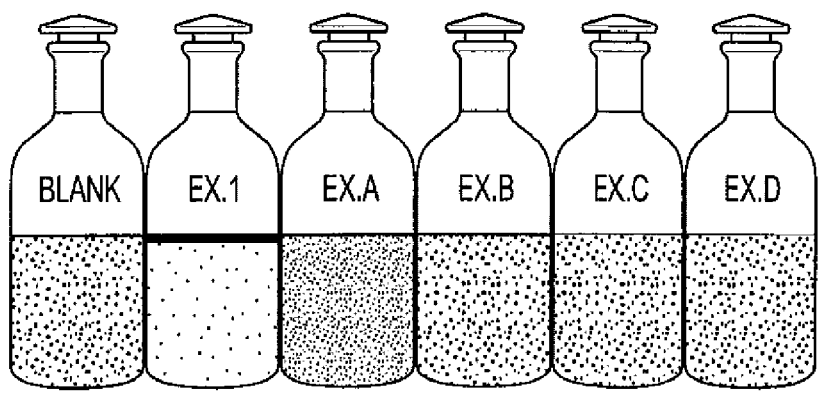
FIG. 1C is a photographic image of the synthetic produced oil-in-water emulsion for Bottle Test Procedure 1, treated with 100 ppm of cationic polymer Example 1 and Comparative Examples A-D (pH about 7.6).

Add a dose (as indicated in the brief descriptions of FIGS. 1B and 1C) of a 0.1 wt. % aqueous solution of each cationic polymer (Example 1 and Comparative Examples A-D) to a separate bottle and include one "BLANK" bottle without any cationic polymer additive for comparison. The dosage level, in ppm (by weight), is based on the amount of cationic polymer added to the total weight of the reverse emulsion in each bottle. Shake all bottles by hand 50 times and allow to resolve for one minute to allow floc formation before capturing an image. Obtain images in the presence of a 50 ppm dosage of cationic polymer (FIG. 1B) and a 100 ppm dosage of cationic polymer (FIG. 1C).

It was observed that the resultant oil flocs separate and float on the surface of the water. It is evident from the results that the cationic polymer from Example 1 facilitates the separation of residual oil and solid particles from the synthetic produced oil-in-water emulsion at a concentration of both 50 ppm and 100 ppm, at a pH of about 7.6.

Bottle Test Procedure 2—Synthetic Produced Oil-in-Water Emulsion pH about 8.7

Prepare the synthetic produced oil-in-water emulsion as in Bottle Test Procedure 1 except add 300 µL of 2 wt. % aqueous NaOH solution to 650 mL of DI water before adding the crude oil. The resultant synthetic produced oil-in-water emulsion has a pH of about 8.7.

Figure 2A:
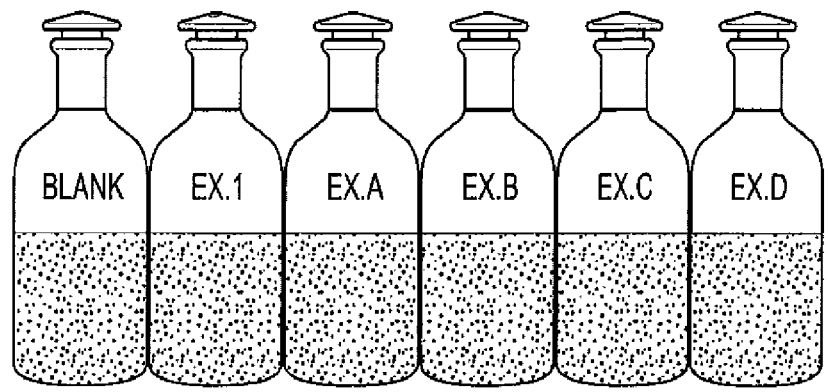
FIG. 2A is a photographic image of the synthetic produced oil-in-water emulsion for Bottle Test Procedure 2, treated with 0 ppm of cationic polymer Example 1 and Comparative Examples A-D (pH about 8.7).

Distribute the synthetic produced oil-in-water emulsion into 6 reagent bottles (100 mL each). An image of the untreated bottles is captured immediately (FIG. 2A).

Figure 2B:
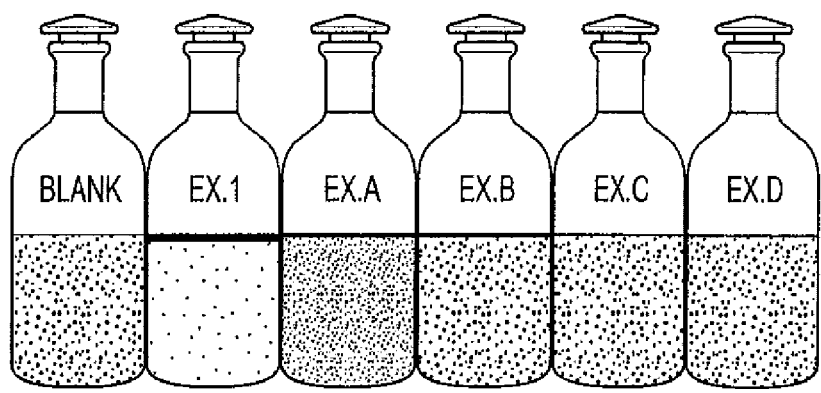
FIG. 2B is a photographic image of the synthetic produced oil-in-water emulsion for Bottle Test Procedure 2, treated with 50 ppm of cationic polymer Example 1 and Comparative Examples A-D (pH about 8.7).

Add a dose (as indicated in the brief description of FIG. 2B) of a 0.1 wt. % aqueous solution of each cationic polymer (Example 1 and Comparative Examples A-D) to a separate bottle and include one "BLANK" bottle without any cationic polymer additive for comparison. The dosage level, in ppm (by weight), is based on the amount of cationic polymer added to the total weight of the reverse emulsion in each bottle. Shake all bottles by hand 50 times and allow to resolve for one minute to allow floc formation before capturing an image. Obtain images in the presence of a 50 ppm dosage of cationic polymer (FIG. 2B).

It was observed that the resultant oil flocs separate and float on the surface of the water. It is evident from the results that the cationic polymer from Example 1 facilitates the separation of residual oil and solid particles from the synthetic produced oil-in-water emulsion at a pH of about 8.7 at a concentration of 50 ppm.

We claim:

1. A method of separating an oil-in-water emulsion formed during crude oil production into a water phase and an oil phase, comprising:
    adding 1 part-per-million (ppm) to 10,000 ppm of a cationic vinyl imidazolium-based copolymer to the oil-in-water emulsion, based on a total volume of the oil-in-water emulsion, to form the water phase and the oil phase, where the cationic vinyl imidazolium-based copolymer is formed with monomers of N-vinylcaprolactam, N-vinyl-2-pyrrolidone and a quaternized N-vinylimidazole; and
    separating the water phase from the oil phase.

2. The method of claim 1, where the quaternized N-vinylimidazole is 3-methyl-N-vinylimidazolium methyl sulfate.

3. The method of claim 1, where the cationic vinyl imidazolium-based copolymer is poly[N-vinylcaprolactam-co-N-vinyl-2-pyrrolidone-co-quaternized N-vinylimidazole].

4. The method of claim 3, where the quaternized N-vinylimidazole is 3-methyl-N-vinylimidazolium methyl sulfate.

5. The method of claim 1, where the cationic vinyl imidazolium-based copolymer is formed as a reaction product of about 50 weight percent (wt. %) of N-vinylcaprolactam, about 40 wt. % N-vinyl-2-pyrrolidone and about 10 wt. % of a quaternized N-vinylimidazole.

6. The method of claim 5, where the quaternized N-vinylimidazole is 3-methyl-N-vinylimidazolium methyl sulfate.

7. The method of claim 1, where the cationic vinyl imidazolium-based copolymer has a weight average molecular weight of about 700,000 g/mol.

* * * * *